(12) United States Patent
Kim

(10) Patent No.: US 12,517,175 B2
(45) Date of Patent: Jan. 6, 2026

(54) TEST DEVICE

(71) Applicant: LS ELECTRIC CO., LTD., Anyang-si (KR)

(72) Inventor: Kihyeon Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 228 days.

(21) Appl. No.: 18/280,744

(22) PCT Filed: Jan. 5, 2022

(86) PCT No.: PCT/KR2022/000149
§ 371 (c)(1),
(2) Date: Sep. 7, 2023

(87) PCT Pub. No.: WO2022/191396
PCT Pub. Date: Sep. 15, 2022

(65) Prior Publication Data
US 2024/0159830 A1    May 16, 2024

(30) Foreign Application Priority Data

Mar. 9, 2021  (KR) .................. 10-2021-0030871

(51) Int. Cl.
*G01R 31/327* (2006.01)
*G01R 1/30* (2006.01)
(Continued)

(52) U.S. Cl.
CPC ............. *G01R 31/327* (2013.01); *G01R 1/30* (2013.01); *G01R 15/181* (2013.01); *G01R 19/15* (2013.01); *G01R 19/18* (2013.01); *G01R 33/02* (2013.01)

(58) Field of Classification Search
CPC ...... G01R 31/327; G01R 1/30; G01R 15/181; G01R 19/15; G01R 19/18; G01R 33/02;
(Continued)

(56) References Cited

U.S. PATENT DOCUMENTS

| 7,268,558 B2 * | 9/2007 | Mills ................. G01R 31/3277 324/555 |
| 9,671,484 B2 | 6/2017 | Youm et al. |

(Continued)

FOREIGN PATENT DOCUMENTS

| JP | 2005257701 A * | 9/2005 |
| KR | 20070119222 A | 12/2007 |

(Continued)

OTHER PUBLICATIONS

International Search Report for related International Application No. PCT/KR2022/000149; action dated Sep. 15, 2022; (2 pages).
(Continued)

*Primary Examiner* — Son T Le
(74) *Attorney, Agent, or Firm* — K&L Gates LLP

(57) ABSTRACT

Disclosed is a test device. The test device according to an embodiment of the present invention is operated by a power supply unit provided to be portable, and tests a sensor device using an alternating current of a high frequency. Therefore, the portability and operation reliability of the test device are improved, and the convenience of use can be improved since a separate wire member or the like for the operation of the test device need not be provided.

12 Claims, 10 Drawing Sheets

(51) Int. Cl.
  *G01R 15/18* (2006.01)
  *G01R 19/15* (2006.01)
  *G01R 19/18* (2006.01)
  *G01R 33/02* (2006.01)

(58) Field of Classification Search
  CPC .............. G01R 31/40; G01R 31/2829; G01R 31/3275; G01R 35/00; G01R 31/3272; G01R 15/20; G01R 19/145; G01R 23/02
  See application file for complete search history.

(56) References Cited

U.S. PATENT DOCUMENTS

2018/0182523 A1* 6/2018 VandenBerg ............ H01F 27/40
2018/0375387 A1* 12/2018 Oshima ................... H02J 50/70

FOREIGN PATENT DOCUMENTS

| KR | 20100108034 A | 10/2010 |
| KR | 101043319 B1 | 6/2011 |
| KR | 20120043324 A | 5/2012 |
| KR | 1020120043326 | 5/2012 |
| KR | 20190015094 A | 2/2019 |

OTHER PUBLICATIONS

Written Opinion for related International Application No. PCT/KR2022/000149; action dated Sep. 15, 2022; (4 pages).
Office Action for related Korean Application No. 10-2021-0030871; action dated Apr. 21, 2023; (4 pages).

* cited by examiner

TEST DEVICE

CROSS-REFERENCE TO RELATED APPLICATIONS

This application is the National Stage filing under 35 U.S.C. 371 of International Application No. PCT/KR2022/000149, filed on Jan. 5, 2022, which claims the benefit of earlier filing date of and rights of priority to Korean Application 10-2021-0030871, filed on Mar. 9, 2021, the contents of which are all hereby incorporated by reference herein in their entirety.

FIELD

The present disclosure relates to a test device, and more particularly, to a test device with improved portability and operational reliability.

BACKGROUND

A breaker refers to a device that is conductively connected to an external power source and a load, respectively, so as to allow or break a conduction state between the power source and the load. When an abnormal current such as an overcurrent from an external power source flows into the breaker, the breaker performs a breaking operation (trip operation) to break the conduction state between the external power source and the load.

A breaker includes a variety of components. As the breaker operates, the components are operated to generate heat. Furthermore, even when an abnormal current is applied from an external power source, excessive heat may be generated in each component of the breaker.

When the generated heat stays in the breaker for more than a preset period of time, there is a risk in that each component of the breaker may be damaged. Therefore, breakers are generally provided with sensing devices for measuring internal or external temperatures.

However, in general, these sensing devices are also provided as electrical devices. Therefore, as the breaker continues to operate, there is a risk in that components of the sensing device may also be damaged.

Accordingly, in order for the breaker to operate stably, an inspection process for the sensing device itself must also be performed separately from an inspection process for the breaker.

Referring to FIGS. 1 and 2, a test device 1000 according to the related art is shown. The test device 1000 according to the related art includes a current supply portion 1100 for applying AC power and a conducting wire member 1200 for transferring the supplied current to a busbar 1300.

A sensor device 1400 is coupled to the bus bar 1300 to receive AC power to check an operation state using a magnetic field formed as a result thereof.

Specifically, a sensor body 1410 of the sensor device 1400 is seated on the bus bar 1300 and coupled to the bus bar 1300 by means of a band 1420 formed of a conductive material. An alternating current applied from the current supply portion 1100 is energized through the bus bar 1300. A magnetic field is formed around the bus bar 1300 by the alternating current.

At this time, the band 1420 is provided to pass through a coil 1430 accommodated inside the sensor body 1410. The formed magnetic field is converted into electrical energy by the coil 1430 and supplied as power for operating the sensor device 1400.

It is well known that a strength of the magnetic field is proportional to a magnitude of the supplied alternating current. Therefore, in order to supply sufficient power to operate the sensor device 1400, the capacity of the current supply portion 1100 needs to be increased. It causes an increase in physical size such as weight and volume of the current supply portion 1100.

As a result, the test device 1000 according to the related art has difficulty in effectively inspecting whether the sensor device 1400 is operating due to carrying the device.

Korean Patent Publication No. 10-2007-0119222 discloses a breaker test device for a digital small mosaic switchboard. Specifically, there is disclosed a breaker test device in which a breaker is actually operated during testing when there is an error in a connection between a control switch of the mosaic device and a relay switch of the breaker, thereby preventing an accident from occurring.

However, the above prior art literature discloses only a structure of a circuit diagram or concept stage for achieving the purpose, but does not provide a specific structure. That is, the prior art literature presents only a method for stably operating a test device, and does not disclose subject matter related to the reduction in size of the test device.

Korean Patent Publication No. 10-2012-0043326 discloses a portable breaker characteristics analysis device. Specifically, there is disclosed a breaker characteristics analysis device in which various components constituting the characteristics analysis device are incorporated into a bag type case so as to improve portability.

However, the prior art literature has a limitation in that a method of achieving the reduction in size and weight of the breaker characteristics analysis device is not disclosed. That is, the characteristic analysis device according to the prior art literature includes a display and various buttons and dials for applying control signals. As a result, apart from being portable, there is a limit in that it is inconvenient to carry the device due to its size and weight.

PRIOR ART LITERATURE

Patent Literature (Patent Literature 1) Korean Patent Publication No. 10-2007-0119222 (Dec. 20, 2007)
(Patent Literature 2) Korean Patent Publication No. 10-2012-0043326 (May 4, 2012)

SUMMARY

The objective of the present disclosure is to provide a test device having a structure capable of solving the above problems.

First, an aspect of the present disclosure is to provide a test device having a structure capable of reliably inspecting whether a sensor device is abnormal.

Furthermore, another aspect of the present disclosure is to provide a test device having a structure capable of achieving the reduction in size and weight of a product.

In addition, still another aspect of the present disclosure is to provide a test device having a structure capable of improving portability.

Moreover, yet still another aspect of the present disclosure is to provide a test device having a structure capable of improving work convenience.

Besides, still yet another aspect of the present disclosure is to provide a test device having a structure in which a separate external power source is not required to perform a work of determining whether a sensor device is abnormal.

In order to achieve the foregoing objectives, the present disclosure provides a test device including a power source portion that supplies a direct current; a control portion conductively connected to the power source portion to convert the supplied direct current into an alternating current; a coil portion conductively connected to the control portion to convert the energy of the alternating current into magnetic energy; and an energization portion conductively connected to the coil portion to form a magnetic field using the alternating current.

Furthermore, the coil portion of the test device may be wound around the energization portion.

Furthermore, the test device may be provided with a plurality of coil portions, and the plurality of coil portions may be wound around the energization portion at different positions.

Furthermore, the energization portion of the test device may include a coil coupling portion around which the coil portion is wound, the coil coupling portion extending in one direction; an arm portion continuously extending to the coil coupling portion, and extending in another direction at a predetermined angle with respect to the coil coupling portion; and a conductive protruding portion extending from one end in a direction in which the arm portion extends at a predetermined angle with respect to the arm portion.

Furthermore, the coil coupling portion, the arm portion and the conductive protruding portion in the energization portion of the test device may be formed of a ferromagnetic body.

Furthermore, two arm portions may be provided and located to face each other and spaced apart from each other in the one direction in the test device, and the two arm portions may continuously extend to respective ends in a direction in which the coil coupling portion extends, respectively.

Furthermore, two conductive protruding portions may be provided in the test device to continuously extend to the two arm portions, respectively, and the two conductive protruding portions may extend toward each other.

Furthermore, the energization portion of the test device may be disposed to be partially surrounded by the coil coupling portion and the two arm portions, the energization portion including a space portion into which a sensor device is inserted.

Furthermore, the control portion of the test device may include a control board that converts the direct current into the alternating current; a power conducting wire allowing the control board and the power source portion to be conductively connected to each other; and a coil conducting wire allowing the control board and the coil portion to be conductively connected to each other.

Furthermore, the control portion of the test device may include a switch having a portion thereof exposed to the outside and being connected to the control board to receive a control signal for operating the control board.

Furthermore, the power source portion of the test device may be provided with a rechargeable battery.

Furthermore, the test device may further include a housing provided with a space therein to accommodate the control portion, the coil portion, and the energization portion.

Furthermore, the housing of the test device may include a body portion accommodating the control portion, the coil portion, and a part of the energization portion; and an extension portion continuously extending to the body portion to accommodate the remaining part of the energization portion, the extension portion being disposed to extend from the body portion.

Furthermore, a plurality of extension portions are provided in the test device, and the plurality of extension portions may be spaced apart from each other and disposed to face each other, and the housing may include a sensor insertion portion, which is a space partially surrounded by the body portion and the plurality of extension portions.

Furthermore, the control portion may amplify a frequency of the alternating current, and the energization portion may form a magnetic field using the alternating current with the amplified frequency.

According to an embodiment of the present disclosure, the following effects can be achieved.

First, a test device includes a coil portion. The coil portion is conductively connected to a control portion to receive a converted alternating current. The coil portion converts the energy of the received alternating current into magnetic energy.

The coil portion is conductively connected to an energization portion. The alternating current amplified at a high frequency by the control portion is transmitted to the energization portion through the coil portion. The energization portion is formed of a ferromagnetic material, and forms a magnetic field using the received alternating current. Accordingly, an energy transmission rate of the alternating current may be further increased.

A sensor device generates power for operation using the generated magnetic field. As described above, since the energy transmission rate of current is increased, power may be formed in a magnitude sufficient to operate the sensor device.

Accordingly, an inspection of whether the sensor device is abnormal can be reliably performed.

Furthermore, as the frequency of the alternating current is amplified by the control portion, a power source for applying a high magnitude of alternating current may not be provided. In addition, the coil portion is wound around the energization portion and conductively connected and coupled to the energization portion. Moreover, in one embodiment, the power source portion that applies DC current to the control portion may be provided in the form of a battery.

Accordingly, the test device can be reduced in size and weight to improve portability.

In addition, the test device is provided with a sensor insertion portion that is a space into which a sensor device is inserted. When the sensor device is inserted into the sensor insertion portion, a sensor coil of the sensor device generates power using a magnetic field formed by the energization portion. That is, a test work of the sensor device may be performed only by inserting the sensor device into the test device.

Thus, the convenience of work for inspecting whether the sensor device is abnormal can be improved.

In addition, the power source portion may be provided in the form of a battery charged by an external power source. That is, the power source portion may supply DC current to the control portion for a predetermined period of time without receiving power from an external power source.

As a result, since there is no need to provide a conducting wire member for connecting between the external power source and the test device, the carrying and operation of the test device can be easily performed.

DETAILED DESCRIPTION

Figure 1:
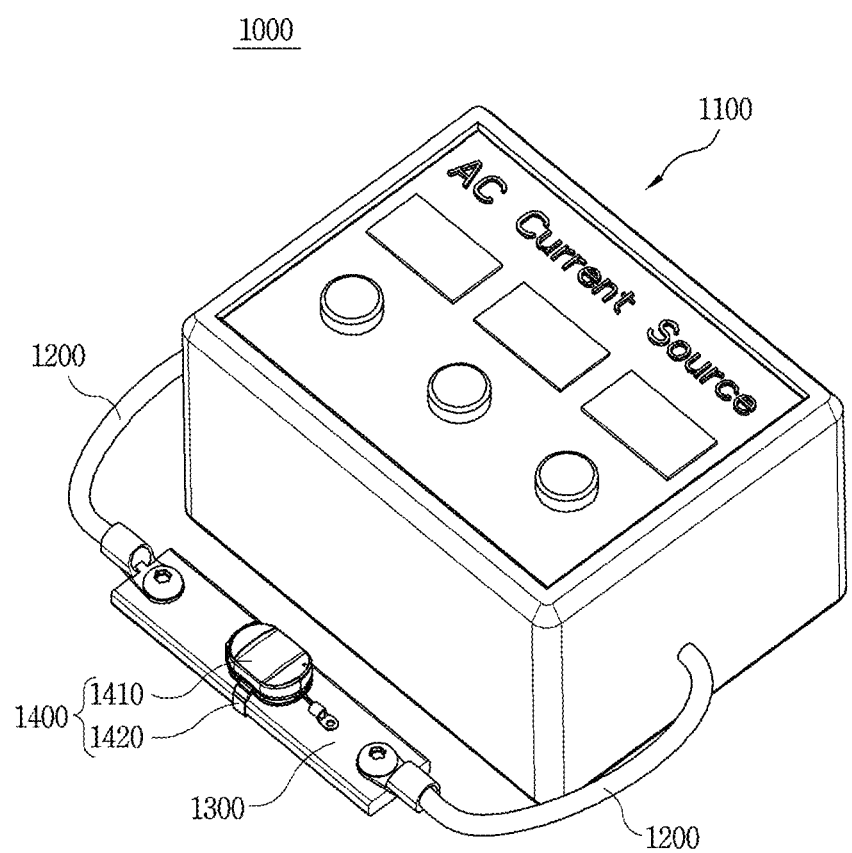
FIG. 1 is a perspective view showing a state in which a sensor is coupled to a test device according to the related art.
Figure 2:
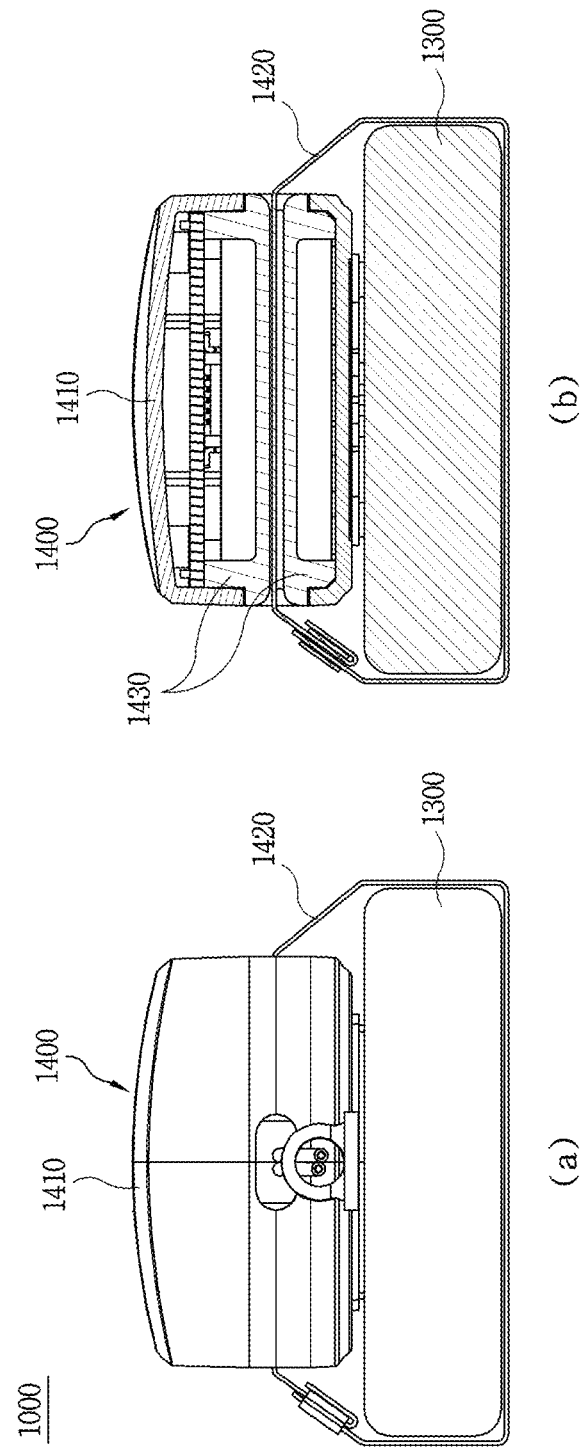
FIG. 2 is a side view (a) and a cross-sectional side view (b) showing a state in which a sensor is coupled to a test device according to the related art.

Hereinafter, a test device 10 according to an embodiment of the present disclosure will be described in detail with reference to the accompanying drawings.

In the following description, a description of some components may be omitted to clarify the characteristics of the present disclosure.

1. Definition of Terms

The term "breaker" used in the following description refers to any device capable of being operated automatically or manually to conductively connect or disconnect between an external power source and a load. In one embodiment, the breaker may be provided in the form of an air breaker, a vacuum breaker, a molded case breaker, or the like.

The term "sensor device" used in the following description refers to any device capable of collecting or sensing information related to the state of any component constituting a breaker. In one embodiment, the sensor device may be configured to sense temperature, pressure, humidity, vibration, and the like of the breaker.

The term "test device" used in the following description refers to any device capable of inspecting whether a sensor device is operating.

The term "conductive connection" used in the following description refers to allowing two or more components to be connected to receive current or electrical control signals.

In one embodiment, the conductive connection may be formed in a wired manner using a conducting wire member or the like, or may be formed in a wireless manner such as Bluetooth or current induction by a magnetic field.

In another embodiment, a conductive connection may be formed by allowing two or more of the components to come into contact with each other.

The terms "upper side", "lower side", "front side", "rear side", "left side" and "right side" used in the following description will be understood with reference to the coordinate systems shown in FIGS. 3 and 14.

2. Description of Configuration of Test Device 10 According to Embodiment of Present Disclosure Referring to FIGS. 3 to 13, a test device 10 according to an embodiment of the present disclosure is shown.

The test device 10 may be coupled to the sensor device 20 to be described later to check whether the sensor device 20 is operating. At this time, the test device 10 may apply an alternating current to the sensor device 20 at a higher frequency than that of the test device 1000 according to the related art.

Accordingly, the test device 10 according to an embodiment of the present disclosure may reliably test whether the sensor device 20 is operating while achieving reduction in size and weight.

In the illustrated embodiment, the test device 10 includes a housing 100, a control portion 200, a coil portion 300, an energization portion 400, and a power source portion 500.

(1) Description of Housing 100

Hereinafter, the housing 100 according to an embodiment of the present disclosure will be described in detail with reference to FIGS. 3 to 6.

The housing 100 constitutes an outer shape of the test device 10. A space is formed inside the housing 100 to mount various components for operating the test device 10 therein.

In the illustrated embodiment, the control portion 200, the coil portion 300, the energization portion 400, and the power source portion 500 may be mounted in an inner space of the housing 100.

Here, a switch 220 of the control portion 200 is exposed to the outside so as to be pressed by a worker. Furthermore, a conductive protruding portion 430 of the energization portion 400 may also be partially exposed to the outside to apply an alternating current to the sensor device 20 coupled thereto.

The housing 100 may be formed of an insulating material. This is to prevent any energization between the generated alternating current and the sensor device 20.

The housing 100 may be formed of a material with high rigidity and light weight. This is to reduce the volume and weight of the test device 10 as a whole.

In one embodiment, the housing 100 may be formed of a synthetic resin of an insulating material, ceramic material, or the like.

In the illustrated embodiment, the housing 100 includes a body portion 110, an extension portion 120 and a sensor insertion portion 130.

The body portion 110 constitutes a part of the housing 100. In the illustrated embodiment, the body portion 110 constitutes a front side of housing 100.

A space is formed inside the body portion 110 to mount various components constituting the test device 10 therein. In the illustrated embodiment, the control portion 200, the coil portion 300, and the energization portion 400 are mounted inside the body portion 110.

A through hole is disposed at one side of the body portion 110, at an upper side thereof in the illustrated embodiment. The switch 220 of the control portion 200 is coupled to the through hole to pass therethrough. The switch 220 is coupled to the through hole and partially exposed to the outside. A worker may press the exposed switch 220 to control whether the test device 10 is operating.

An inner space of the body portion 110 communicates with an inner space of the extension portion 120. The energization portion 400 partially accommodated in the inner space of the body portion 110 may extend into an inner space of the extension portion 120.

In the illustrated embodiment, the body portion 110 is provided in a polygonal columnar shape including a portion that is inclined upward toward a rear side thereof and a portion that extends flat to the rear side. The shape of the body portion 110 may have any shape capable of mounting various components constituting the test device 10 therein.

An opening portion is disposed on any one of surfaces constituting the body portion 110, on a right surface in the illustrated embodiment. A conducting wire member (not shown) or the like for applying power to the power source portion 500 accommodated in the inner space of the body portion 110 may pass through the opening portion.

As will be described later, the power source portion 500 according to an embodiment of the present disclosure may be provided in the form of a battery. In the above embodiment, it will be understood that a port for charging the power source portion 500 may be coupled to the opening portion.

The body portion 110 continuously extends to the extension portion 120.

The extension portion 120 constitutes another part of housing 100. In the illustrated embodiment, the extension portion 120 constitutes a rear side of housing 100.

The extension portion 120 continuously extends to the body portion 110 and extends in a direction opposite to the body portion 110. In the illustrated embodiment, the extension portion 120 extends from a rear-side end of the body portion 110 toward a rear side thereof.

A space is formed inside the extension portion 120. An arm portion 420 of the energization portion 400 is mounted in the space.

A plurality of extension portions 120 may be provided. The plurality of extension portions 120 may be spaced apart from each other to face each other. A plurality of arm portions 420 may be respectively mounted on each extension portion 120.

In the illustrated embodiment, two extension portions 120 are provided, and are located at left and right sides of the rear of the body portion 110, respectively. The number of extension portions 120 may be varied according to the number of arm portions 420.

An opening portion may be disposed on each surface where the two extension portions 120 face each other. The conductive protruding portion 430 of the energization portion 400 may be partially exposed through the opening portion. When the test device 10 and the sensor device 20 are coupled to each other, an alternating current may be applied to the sensor device 20 through the exposed portion of the conductive protruding portion 430. Specifically, an alternating current may be applied to an internal coil of the sensor device 20.

Here, it will be understood that a position of the opening portion may be varied according to a position of the sensor coil 22 of the sensor device 20.

A space formed between the two extension portions 120 may be defined as the sensor insertion portion 130.

The sensor insertion portion 130 is a space in which the sensor device 20 coupled to the test device 10 is accommodated. The sensor device 20 inserted into the sensor insertion portion 130 may be operated by receiving an alternating current through the energization portion 400. Specifically, the internal coil of the sensor device 20 may be operated by receiving an alternating current.

The sensor insertion portion 130 is partially surrounded by the body portion 110 and the extension portion 120. Specifically, in the illustrated embodiment, a front side of the sensor insertion portion 130 is surrounded by the body portion 110. Furthermore, left and right sides of the sensor insertion portion 130 are surrounded by two extension portions 120 facing each other.

Upper, lower and rear sides of the sensor insert 130 are configured to be open. The sensor device 20 may be accommodated in the sensor insertion portion 130 through one or more directions of the upper, lower and rear sides.

Figure 4:
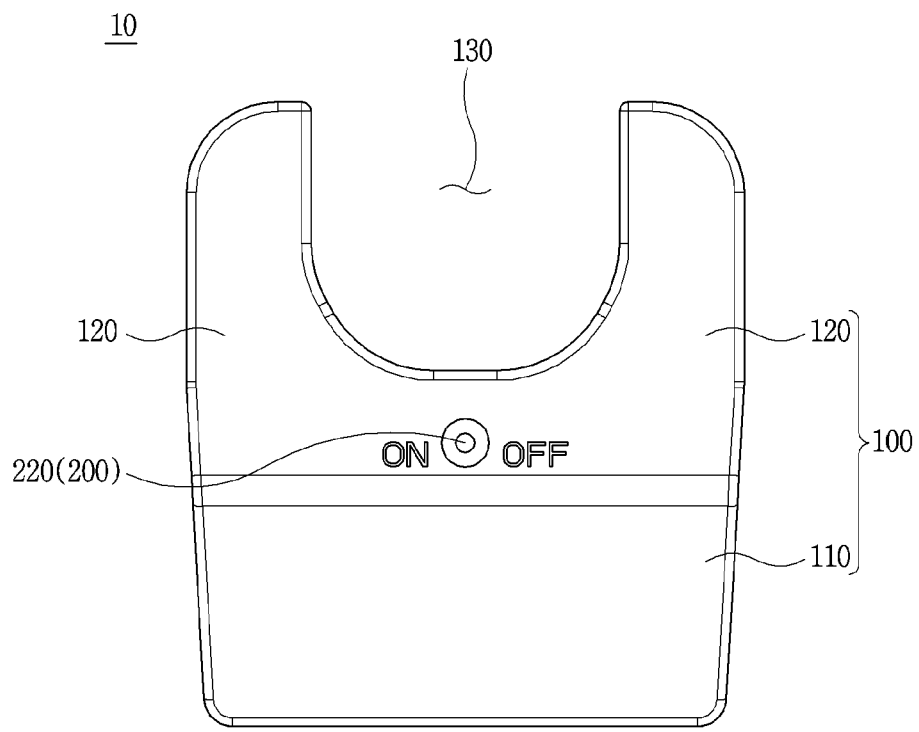
FIG. 4 is a plan view showing the test device of FIG. 3.
Figure 5:
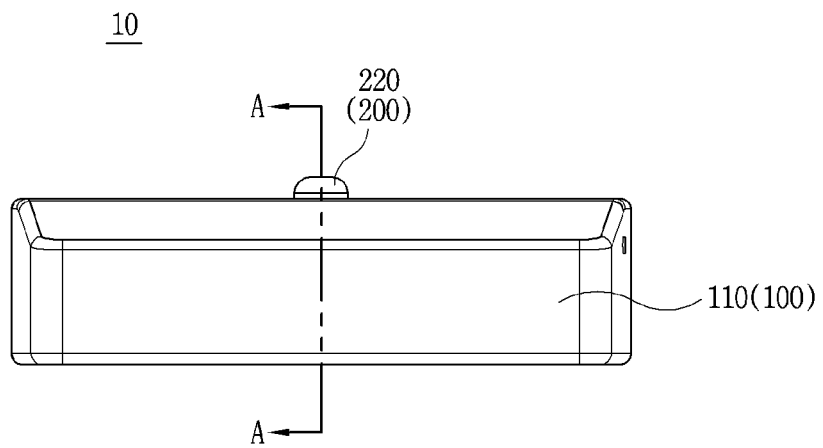
FIG. 5 is a front view showing the test device of FIG. 3.
Figure 6:
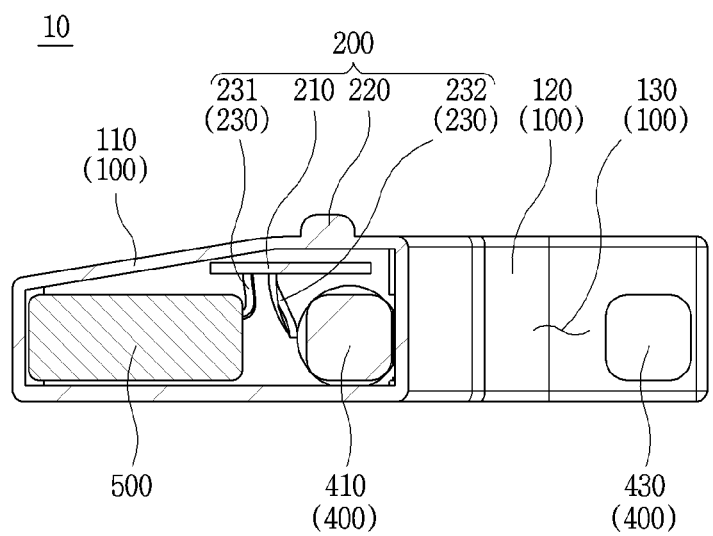
FIG. 6 is a cross-sectional view along line A-A showing the test device of FIG. 3.

In the illustrated embodiment, the sensor insertion portion 130 has a "U" shape with left and right sides extending in a front-back direction and a front side rounded outward (see FIG. 4). The shape of the sensor insertion portion 130 may be varied according to the shapes of the body portion 110 and the extension portion 120 surrounding the sensor insertion portion 130.

Figure 14:
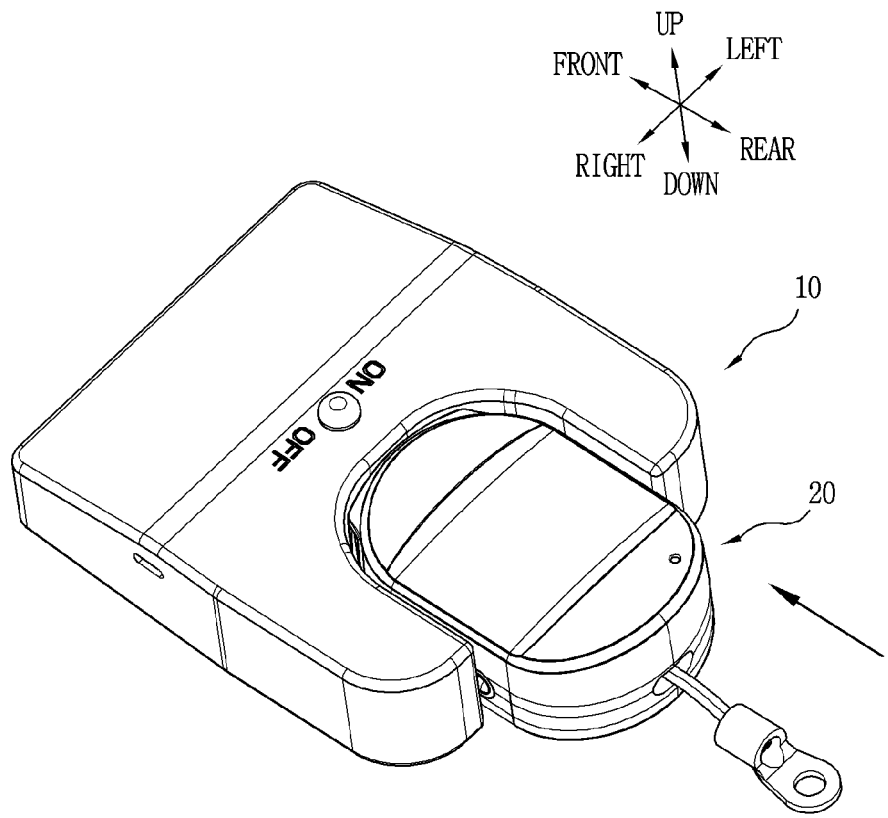
FIG. 14 is a perspective view showing a state in which a wireless sensor is coupled to the test device of FIG. 3.
Figure 15:
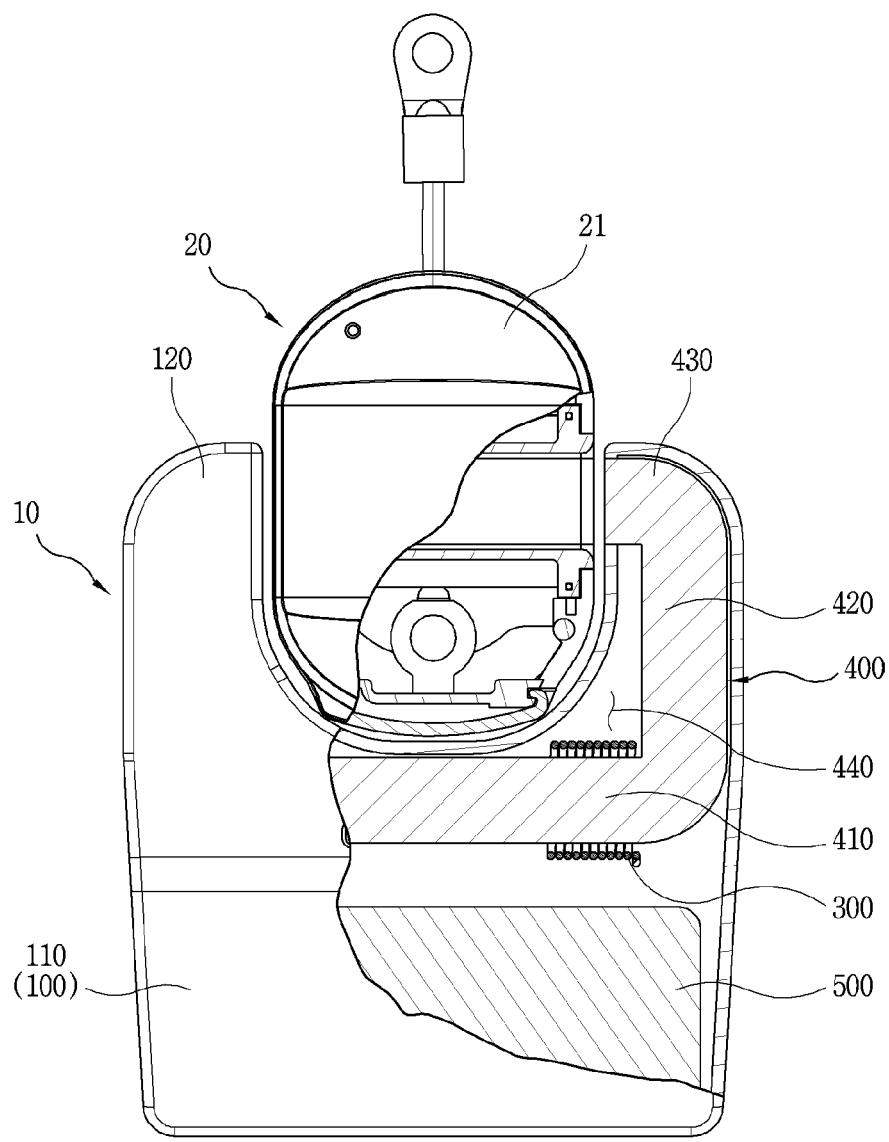
FIG. 15 is a partially cut-away plan view showing a state in which a wireless sensor is coupled to the test device of FIG. 3.
Figure 16:
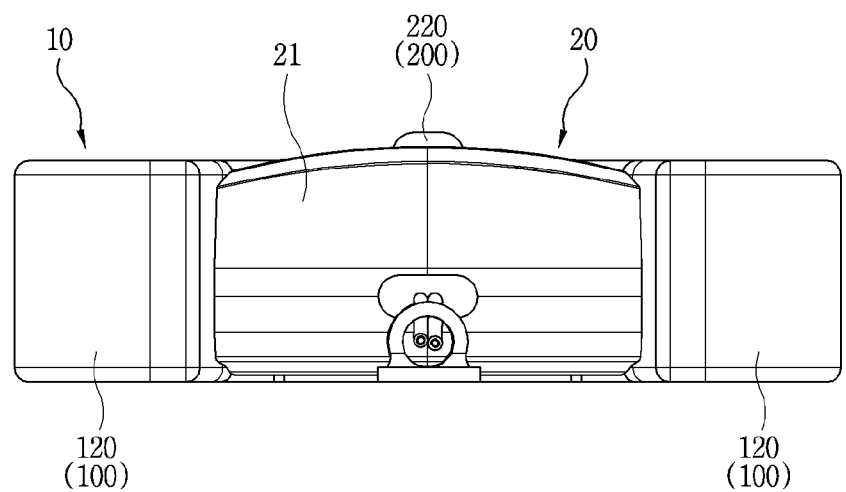
FIG. 16 is a rear view showing a state in which a wireless sensor is coupled to the test device of FIG. 3.

The foregoing description assumes that a single sensor device 20 is inserted into the sensor insertion portion 130 (see FIG. 14). Alternatively, a plurality of sensor devices 20 may be simultaneously inserted into the sensor insertion portion 130.

Of course, in the above embodiment, it will be understood that a width length of the sensor insertion portion 130, that is, in a left-right length thereof in the illustrated embodiment should be further increased.

(2) Description of Control Portion 200

Hereinafter, the control portion 200 according to an embodiment of the present disclosure will be described in detail with reference to FIGS. 7 to 13.

The control portion 200 converts a direct current applied from the power source portion 500 into an alternating current. The alternating current converted by the control portion 200 is transmitted to the coil portion 300 and the energization portion 400 to be used as a power source for operating the sensor device 20.

The control portion 200 is accommodated in the inner space of the housing 100. Specifically, the control portion 200 is accommodated in the inner space of the body portion 110. At this time, the switch 220 may be exposed to an outside of the body portion 110.

The control portion 200 is located between the coil portion 300 or the energization portion 400 and the power source portion 500. In the illustrated embodiment, a front side of a control board 210 of the control portion 200 partially covers an upper side of the power source portion 500. In addition, a rear side of the control board 210 of the control portion 200 partially covers the upper sides of the coil portion 300 and the energization portion 400.

The control portion 200 is conductively connected to the power source portion 500. A current (i.e., direct current) generated by the power source portion 500 may be transmitted to the control portion 200. The connection may be formed by a power conducting wire 231 of a conducting wire portion 230.

The control portion 200 is conductively connected to the coil portion 300. An alternating current converted by the control portion 200 may be transmitted to the coil portion 300 and the energization portion 400 conductively connected thereto. The connection may be formed by a coil conducting wire 232 of the conducting wire portion 230.

Although not shown, the control portion 200 may include a device for communication. The communication device may be linked to the sensor device 20 to receive a test result and transmit it to an external server or the like. In the above embodiment, the communication device may be provided in a wireless manner such as Bluetooth, RFID, Wi-Fi, or provided in a wired manner such as being connected to the server by a conducting wire member.

In the illustrated embodiment, the control portion 200 includes a control board 210, a switch 220 and a conducting wire portion 230.

The control board 210 converts DC power received from the power source portion 500 into AC power. The AC power converted by the control board 210 is transmitted to the coil portion 300 and the energization portion 400, and is used as power for operating the sensor device 20.

The control board 210 is accommodated in the inner space of the housing 100. Specifically, the control board 210 is accommodated in a space formed inside the body portion 110 so as not to be exposed to the outside.

The control board 210 is connected to the switch 220. When the switch 220 is manipulated by pressing, the control board 210 may be operated or stopped.

The control board 210 is conductively connected to the power source portion 500. A DC current generated by the power source portion 500 may be transmitted to the control board 210. The connection is achieved by the power conducting wire 231 of the conducting wire portion 230.

The control board 210 is conductively connected to the coil portion 300. The AC power converted by the control board 210 may be transmitted to the coil portion 300 and amplified. The connection is achieved by the coil conductor 232 of the conducting wire portion 230.

The control board 210 may be provided in any form capable of converting a direct current into an alternating current. In one embodiment, the control board 210 may be provided with a DC-AC inverter (direct current-alternating current inverter).

The control board 210 is connected to the switch 220.

Figure 3:
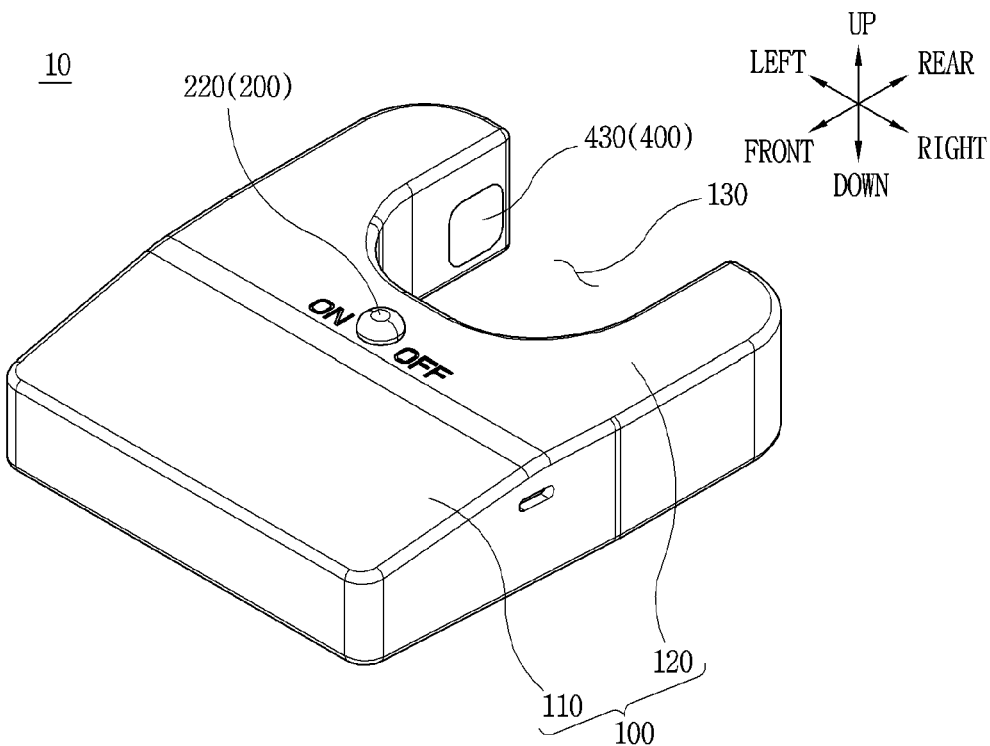
FIG. 3 is a perspective view showing a test device according to an embodiment of the present disclosure.

The switch 220 is manipulated by a worker to receive a control signal for operating or stopping the control portion 200 (see FIG. 3).

The switch 220 is partially exposed to an outside of the housing 100. Specifically, a part of the switch 220 is accommodated in an inner space of the body portion 110, and the remaining part thereof is exposed to an outside of the body portion 110, that is, an upper side thereof in the illustrated embodiment.

The switch 220 may be provided in any form that can be manipulated by the worker to receive a control signal. In one embodiment, the switch 220 may be provided in the form of a toggle switch that is manipulated by pressing. In another embodiment, the switch 220 may be provided in the form of a rotationally manipulated dial switch.

The switch 220 is connected to the control board 210. A control signal input by manipulating the switch 220 may be transferred to the control board 210.

The conducting wire portion 230 allows the control portion 200 to be conductively connected to the coil portion 300, the energization portion 400, and the power source portion 500.

The conducting wire portion 230 is accommodated in the inner space of the housing 100. Specifically, the conducting wire portion 230 is accommodated in the inner space of the body portion 110 so as not to be exposed to the outside.

A plurality of conducting wire portions 230 may be provided. A plurality of conducting wire portions 230 may allow the control board 210 to be connected to the coil portion 300, the energization portion 400 and the power source portion 500, respectively.

In the illustrated embodiment, the conducting wire portion 230 includes a power conducting wire 231 and a coil conducting wire 232.

The power conducting wire 231 allows the control board 210 to be conductively connected to the power source portion 500. In addition, the coil conducting wire 232 allows the control board 210 to be conductively connected to the coil portion 300.

As will be described later, since the coil portion 300 is wound around the energization portion 400, it will be understood that the control board 210 and the energization portion 400 are also conductively connected to each other by the coil conducting wire 232.

In the illustrated embodiment, two coil conducting wires 232 are provided, and connected to the two coil portions 300, respectively. The number of coil conducting wires 232 may be varied according to the number of coil portions 300.

(3) Description of Coil Portion 300

Hereinafter, the coil portion 300 according to an embodiment of the present disclosure will be described in detail with reference to FIGS. 7 to 13.

The control portion 200 converts a direct current into an alternating current. The converted alternating current may be amplified into a high frequency alternating current by the control portion 200.

Accordingly, even when a heavy-weight AC power source is not separately provided, an alternating current that is sufficient to operate the sensor device 20 may be generated.

The coil portion 300 is accommodated inside the housing 100. Specifically, the coil portion 300 is accommodated in the inner space of the body portion 110 so as not to be exposed to the outside.

The coil portion 300 is conductively connected to the control portion 200. Specifically, the coil portion 300 is conductively connected to the control board 210 by the coil conducting wire 232 of the conducting wire portion 230.

The coil portion 300 is wound around the energization portion 400. Specifically, the coil portion 300 is wound around a coil coupling portion 410 of the energization portion 400 to be conductively connected to the energization portion 400.

Accordingly, the alternating current amplified at a high frequency by the control portion 200 may be transmitted to the energization portion 400.

A plurality of coil portions 300 may be provided. The plurality of coil portions 300 may be spaced apart from each other and coupled to the energization portion 400 at different positions. In the illustrated embodiment, two coil portions 300 are provided to be coupled to the energization portion 400 at positions spaced apart from each other in a left-right direction.

The number of coil portions 300 may be varied. For example, a single coil portion 300 extending longer (that is, having a larger width in a left-right direction) than the coil portion 300 according to the illustrated embodiment may be provided.

The number of coil portions 300 may be determined according to a size of the entire test device 10 and a size of the frequency of AC power required to operate the sensor device 20.

A process in which the alternating current transmitted to the coil portion 300 is amplified at a high frequency by the coil portion 300 is a well-known technology, and thus a detailed description thereof will be omitted.

(4) Description of Energization Portion 400

Hereinafter, the energization portion 400 according to an embodiment of the present disclosure will be described in detail with reference to FIGS. 7 to 13.

The energization portion 400 receives the alternating current amplified at a high frequency by the coil portion 300. In addition, the energization portion 400 transmits the received alternating current to the sensor device 20 accommodated in the sensor insertion portion 130 to form a magnetic field. Accordingly, the sensor device 20 may be operated to perform a function of the test device 10.

The energization portion 400 is conductively connected to the control portion 200. Specifically, the energization portion 400 is conductively connected to the control portion 200 via the coil portion 300.

The energization portion 400 is coupled to the coil portion 300. Specifically, the coil portion 300 is wound around the coil coupling portion 410 of the energization portion 400 to be conductively connected to each other.

The energization portion 400 is accommodated in the inner space of the housing 100. Specifically, the coil coupling portion 410 of the energization portion 400 is accommodated in the inner space of the body portion 110 of the housing 100. In addition, the arm portion 420 of the energization portion 400 is accommodated in the inner space of the extension portion 120 of the housing 100.

Moreover, a part of the conductive protruding portion 430 of the energization portion 400 is accommodated in an inner space of the extension portion 120, but the remaining part is exposed to the outside.

The energization portion 400 may be formed of a conductive material or a ferromagnetic material. This is to ensure that the alternating current amplified at a high frequency by the control portion 200 is efficiently energized through the coil portion 300 to form a magnetic field that is sufficient to operate the sensor device 20.

In one embodiment, the energization portion 400 may be provided in the form of iron (Fe), an alloy containing iron (Fe), an electromagnet, a permanent magnet, or the like.

In the illustrated embodiment, the energization portion 400 includes a coil coupling portion 410, an arm portion 420, a conductive protruding portion 430, and a space portion 440.

The coil coupling portion 410 is a portion around which the coil portion 300 is wound. The coil coupling portion 410 may be conductively connected to the wound coil portion 300 to receive an alternating current amplified at a high frequency by the coil portion 300.

The coil coupling portion 410 is accommodated in the inner space of the body portion 110. At this time, the coil coupling portion 410 may be disposed to face the power source portion 500 with the control portion 200 interposed therebetween. That is, in the illustrated embodiment, the coil coupling portion 410 is located at a rear side, which is a direction opposite to the power source portion 500.

The coil coupling portion 410 partially surrounds the space portion 440, which is a space in which the sensor device 20 is accommodated. In the illustrated embodiment, the coil coupling portion 410 surrounds a front side of the space portion 440.

The coil coupling portion 410 extends in a width direction of the housing 100, that is, in a left-right direction in the illustrated embodiment. As described above, in one embodiment, two coil portions 300 may be provided so as to be spaced apart from each other in a direction in which the coil coupling portion 410 extends.

In the illustrated embodiment, the two coil portions 300 are spaced apart in a left-right direction and wound respectively around the coil coupling portion 410.

Each end in a direction in which the coil coupling portion 410 extends, each end in the left-right direction in the illustrated embodiment continuously extends to the arm portion 420.

The arm portion 420 transmits the alternating current transmitted to the coil coupling portion 410 to the conductive protruding portion 430. The arm portion 420 is conductively connected to the coil coupling portion 410 and the conductive protruding portion 430, respectively.

The arm portion 420 continuously extends to the coil coupling portion 410 and the conductive protruding portion 430, respectively. In the illustrated embodiment, a front-side end of the arm portion 420 continuously extends to the coil coupling portion 410. In addition, a rear-side end of the arm portion 420 continuously extends to the conductive protruding portion 430.

The arm portion 420 may extend at a predetermined angle with respect to the coil coupling portion 410. In one embodiment, the predetermined angle may be a right angle.

The arm portion 420 is accommodated in the inner space of the housing 100. Specifically, the arm portion 420 is accommodated in an inner space of the extension portion 120 of the housing 100. The arm portion 420 is not exposed to an outside of the housing 100.

The arm portion 420 extends in a direction opposite to the coil coupling portion 410, toward a rear side in the illustrated embodiment. It will be understood that a direction in which the arm portion 420 extends is the same as that in which the extension portion 120 extends.

A plurality of arm portions 420 may be provided. The plurality of arm portions 420 may be spaced apart from each other to face each other. In the illustrated embodiment, two arm portions 420 are provided to continuously extend to left and right ends of the coil coupling portion 410, respectively. The number and positions of the arm portions 420 may be varied to correspond to the number and positions of the extension portions 120.

A space in which the two arm portions 420 are spaced apart from each other may be defined as a space portion 440. The two arm portions 420 surround left and right sides of the space portion 440, respectively.

One end in a direction in which the arm portion 420 extends, that is, a rear-side end thereof in the illustrated embodiment, continuously extends to the conductive protruding portion 430.

The conductive protruding portion 430 forms a magnetic field using an alternating current amplified at a high frequency. The sensor device 20 may be operated by the magnetic field formed by the conductive protruding portion 430 to perform a function of the test device 10.

The conductive protruding portion 430 continuously extends to the arm portion 420. Specifically, the conductive protruding portion 430 continuously extends to one end in a direction in which the arm portion 420 extends, that is a rear end thereof in the illustrated embodiment.

The conductive protruding portion 430 extends in a direction opposite to the arm portion 420. The conductive protruding portion 430 may extend at a predetermined angle with respect to the arm portion 420. In one embodiment, the predetermined angle may be a right angle.

The conductive protruding portion 430 extends inward, that is, in a direction toward the space portion 440. As will be described later, a plurality of conductive protruding portions 430 may be provided. Accordingly, it can be said that the conductive protruding portions 430 extend in directions toward each other.

The conductive protruding portion 430 is partially exposed to an outside of the housing 100 (see FIG. 3). That is, one end opposite to the arm portion 420 (i.e., an end in a direction toward the space portion 440) of respective ends thereof in an extension direction of the conductive protruding portion 430 is exposed outward.

Accordingly, a magnetic field formed in the conductive protruding portion 430 may be transmitted to the sensor device 20 without being attenuated.

A plurality of conductive protruding portions 430 may be provided. The plurality of conductive protruding portions 430 may continuously extend to the plurality of arm portions 420, respectively. In the illustrated embodiment, two conductive protruding portions 430 are provided to continuously extend to the arm portions 420 located on the left and right sides, respectively.

In the above embodiment, extension directions of the conductive protruding portions 430 may be defined as directions toward each other as described above.

In one embodiment, a surface of an end portion where the conductive protruding portion 430 is exposed to the outside may be located on the same plane as a surface on which the plurality of extension portions 120 face each other. That is, a surface of the end of the conductive protruding portion 430 does not protrude to an outside or retract to an inside of the extension portion 120.

As a result, the sensor device 20 may be easily inserted thereinto and pulled out therefrom, and a magnetic field formed by the conductive protruding portion 430 may be transmitted to the sensor device 20 without being attenuated.

Although the foregoing has been described on the premise that a magnetic field is formed by the conductive protruding portion 430, it will be understood that a magnetic field may also be formed by the coil coupling portion 410 and the arm portion 420 through which an alternating current amplified at a high frequency is energized.

Furthermore, although not shown, other ferromagnetic materials may be coupled to the coil coupling portion 410, the arm portion 420, and the conductive protruding portion 430. The ferromagnetic material may be disposed to surround the sensor device 20 coupled to the test device 10 so as to enhance a strength of the magnetic field formed.

For example, the ferromagnetic material may be provided in the form of a hinge or slide to be coupled to the conductive protruding portion 430. When the sensor device 20 is accommodated in the sensor insertion portion 130, the ferromagnetic material may be spread or slid to surround the sensor device 20.

In the above embodiment, a strength of the magnetic field formed by the test device 10 may be enhanced to improve reliability of an operation (i.e., for testing) of the sensor device 20.

In another embodiment, the ferromagnetic material may be coupled to the conductive protruding portion 430, and when the sensor device 20 is accommodated in the sensor insertion portion 130, the ferromagnetic material may be slid and coupled to the sensor device 20 to pass therethrough.

The space portion 440 is a space in which the sensor device 20 is accommodated. The space portion 440 includes the sensor insertion portion 130. In other words, it can be said that the sensor insertion portion 130 is a part of the space portion 440.

The space portion 440 may be defined as a space formed between a plurality of arm portions 420 spaced apart from each other. In the illustrated embodiment, two arm portions 420 are provided and located on the left and right sides, respectively, and the space portion 440 is formed therebetween. Thus, it can be said that the plurality of arm portions 420 are disposed to face each other with the space portion 440 interposed therebetween.

The space portion 440 is partially surrounded by the coil coupling portion 410, the arm portion 420, and the conductive protruding portion 430.

Specifically, in the illustrated embodiment, a front side of the space portion 440 is surrounded by the coil coupling portion 410. In addition, the left and right sides of the space portion 440 are surrounded by the arm portions 420. Furthermore, a front side of the space portion 440 is partially surrounded by the conductive protruding portion 430.

Figure 7:
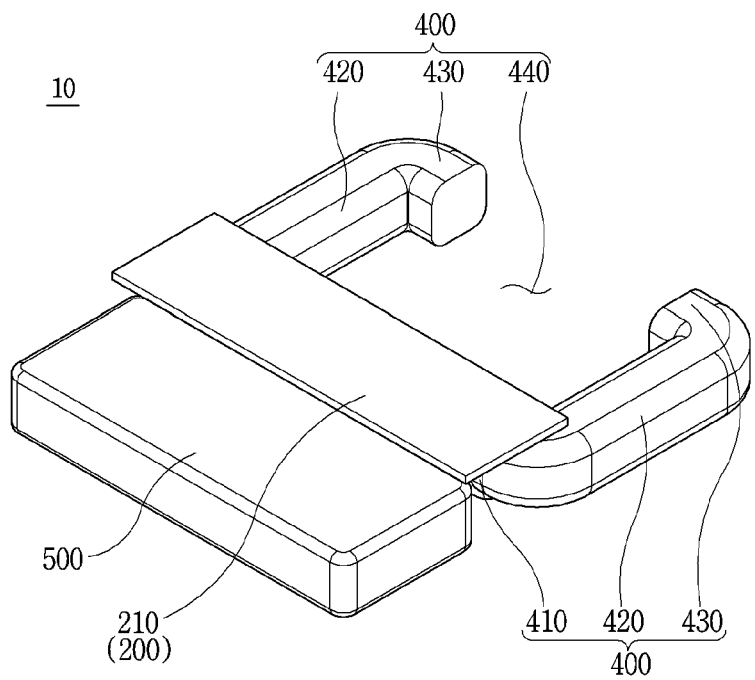
FIG. 7 is a perspective view showing an internal configuration of the test device of FIG. 3.
Figure 8:
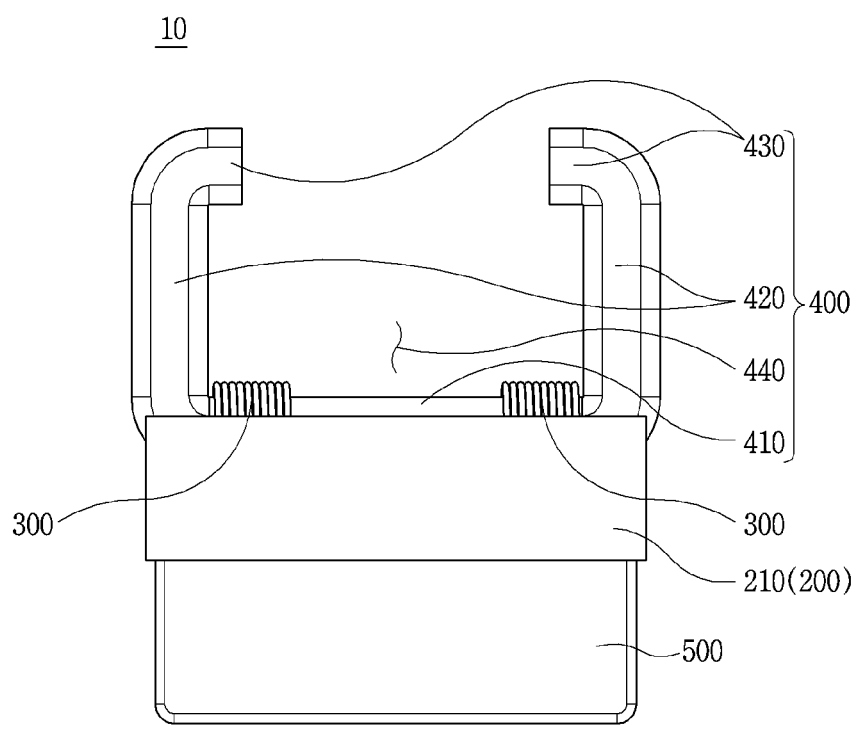
FIG. 8 is a plan view showing the internal configuration of the test device of FIG. 3.
Figure 9:
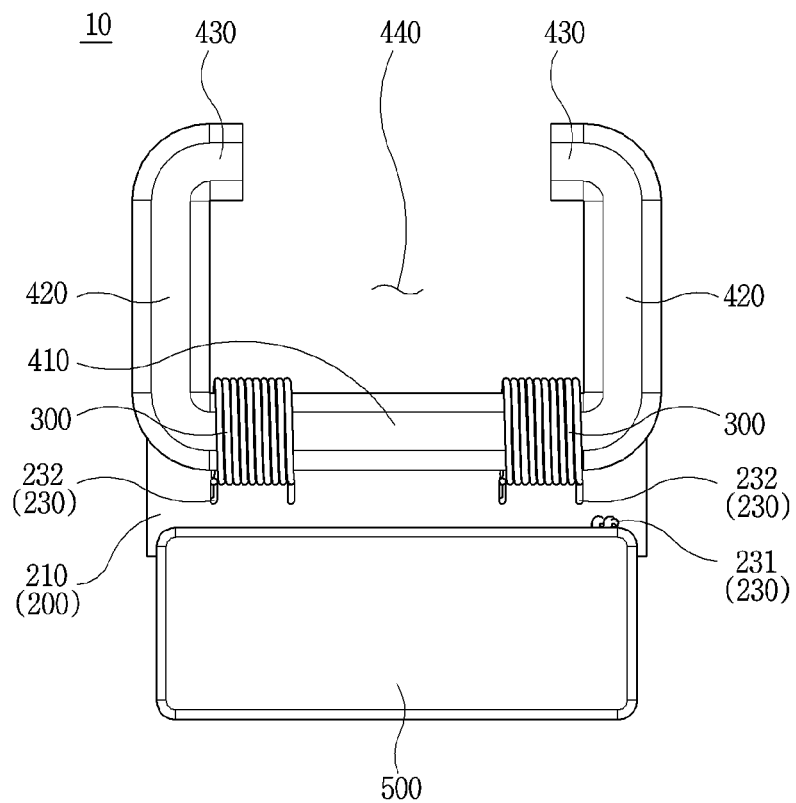
FIG. 9 is a bottom view showing the internal configuration of the test device of FIG. 3.
Figure 10:
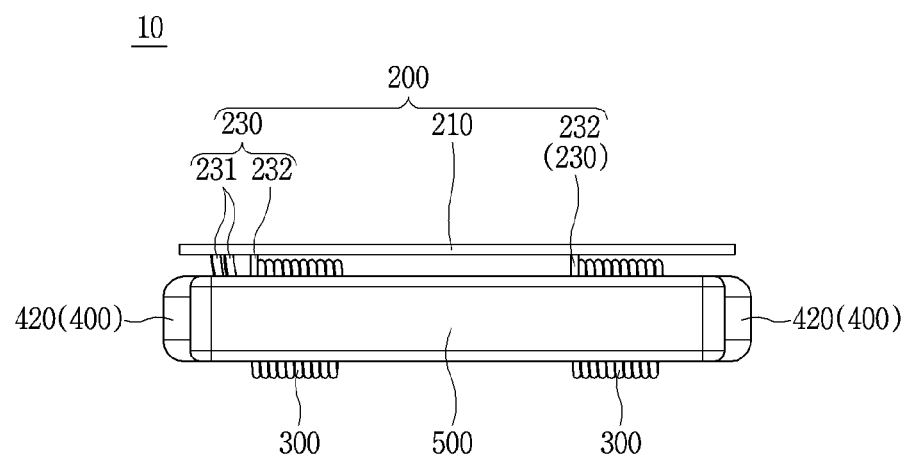
FIG. 10 is a front view showing the internal configuration of the test device of FIG. 3.
Figure 11:
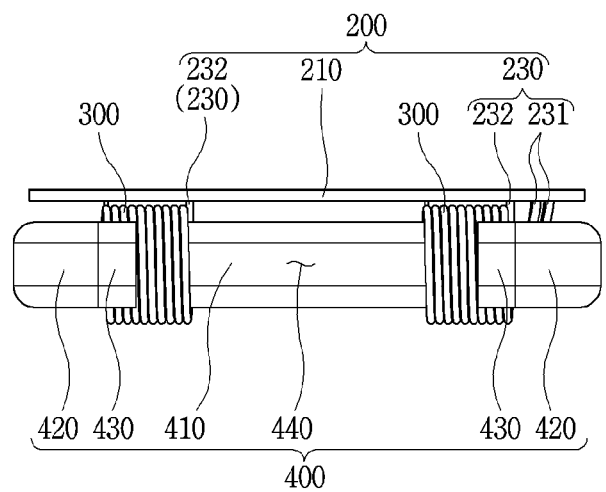
FIG. 11 is a rear view showing the internal configuration of the test device of FIG. 3.
Figure 12:
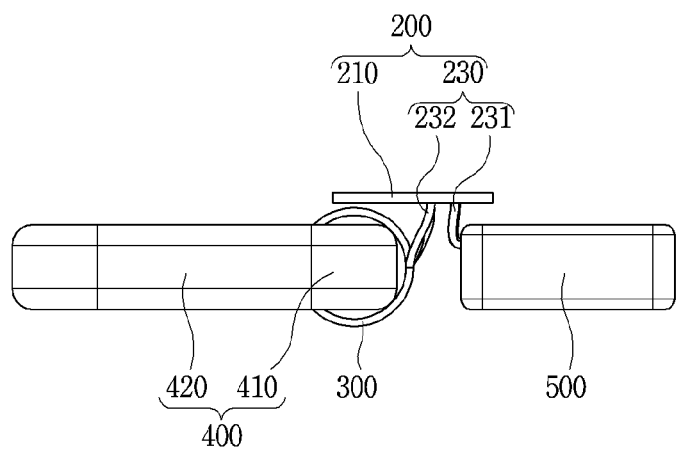
FIG. 12 is a left-side view showing the internal configuration of the test device of FIG. 3.
Figure 13:
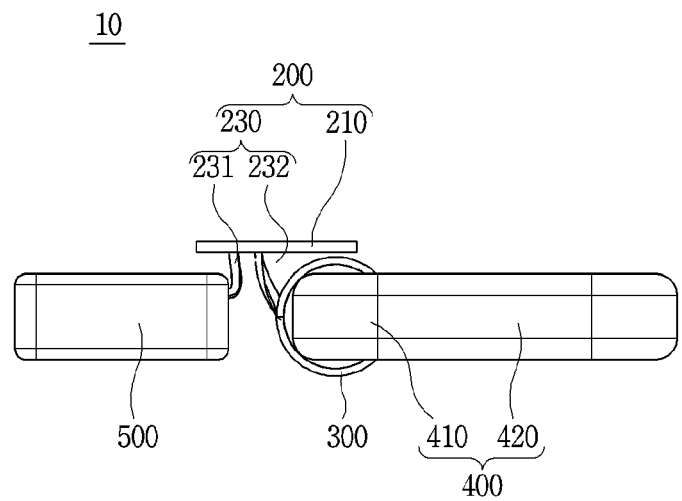
FIG. 13 is a right-side view showing the internal configuration of the test device of FIG. 3.

As can be seen with reference to FIGS. 3 and 7 together, a distance at which the two extension portions 120 are spaced apart from each other is shorter than a distance at which the two arm portions 420 are spaced apart from each other. Accordingly, it will be understood that the sensor insertion portion 130 may be defined as a part of the space portion 440.

(5) Description of Power Source Portion 500

Hereinafter, the power source portion 500 according to an embodiment of the present disclosure will be described in detail with reference to FIGS. 7 to 13.

The power source portion 500 supplies a direct current, which is a prototype of an alternating current, to operate the sensor device 20.

The power source portion 500 is conductively connected to the control board 210 of the control portion 200. The connection is achieved by the power conducting wire 231 of the conducting wire portion 230.

The power source portion 500 is spaced apart from the coil portion 300 and the energization portion 400. In addition, the power source portion 500 is disposed to face the coil portion 300 and the energization portion 400 with the control portion 200 interposed therebetween.

In the illustrated embodiment, the power source portion 500 is located on the front side, and is disposed to face the coil portion 300 and the energization portion 400 located on the rear side. A rear side of the power source portion 500 is partially covered by the control board 210.

The power source portion 500 may be provided in any form capable of generating a direct current for a predetermined period of time without supplying an external power source. In one embodiment, the power source portion 500 may be provided in the form of a battery such as a lithium-ion battery.

In the above embodiment, the test device 10 may be operated for a predetermined period of time without being supplied with power from the outside. In addition, since the power source portion 500 is provided with a small and lightweight battery, the size and weight of the test device 10 may be reduced, thereby improving portability and work convenience.

In an embodiment in which the power source portion 500 is provided with a battery, a conducting wire member (not shown) may be connected to the power source portion 500 through an opening portion disposed on a right surface of the body portion 110 of the housing 100 described above.

The conducting wire member (not shown) may allow an external power source and the power source portion 500 to be conductively connect to each other so as to supply power for charging the power source 500.

Alternatively, the power source portion 500 may be operated by receiving power from an external power source.

In the above embodiment, a conducting wire member for supplying power to the power source portion 500 may pass through the opening portion disposed on a right surface of the body portion 110.

3. Description of Coupling Relationship Between Test Device 10 and Sensor Device 20 According to Embodiment of Present Disclosure The test device 10 according to an embodiment of the present disclosure may be reduced in size and weight to improve reliability of a test result of the sensor device 20 while improving portability.

Hereinafter, a coupling relationship between the test device 10 and the sensor device 20 according to an embodiment of the present disclosure will be described with reference to FIGS. 14 to 17.

(1) Description of Sensor Device 20

The sensor device 20 is provided in a breaker to sense information on an environment inside or outside the breaker. In one embodiment, information sensed by the sensor device 20 may include temperature, humidity, dust concentration, pressure, and the like.

Figure 17:
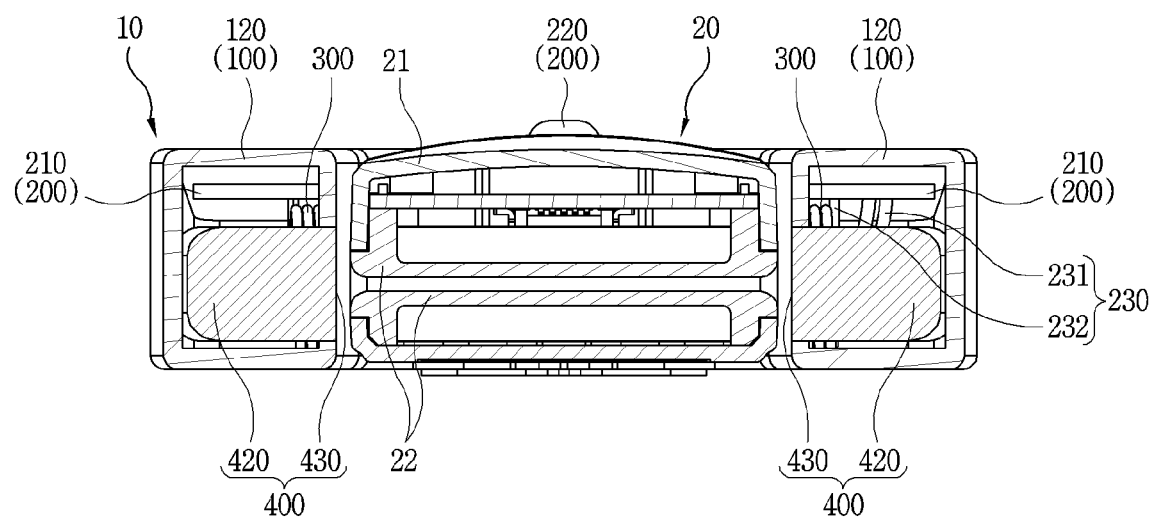
FIG. 17 is a front cross-sectional view showing a state in which a wireless sensor is coupled to the test device of FIG. 3.

As best shown in FIG. 17, the sensor device 20 may include a sensor body 21 and a sensor coil 22.

The sensor body 21 may constitute an outer shape of the sensor device 20, and a space is formed therein to mount various components for the sensor device 20 to operate.

The sensor coil 22 is accommodated inside the sensor body 21 to generate power using a magnetic field. The sensor device 20 may be operated by the generated power. Accordingly, the sensor coil 22 may be referred to as a harvesting coil.

A plurality of sensor coils 22 may be provided. The plurality of sensor coils 22 may be spaced apart from each other to face each other. In the illustrated embodiment, two sensor coils 22 are provided and are spaced apart from each other in a top-bottom direction.

The number and arrangement of the sensor coils 22 may be determined to be any number and position capable of generating power for the sensor device 20 to operate.

A process of converting a magnetic field into electric power by the sensor coil 22 is a well-known technology, and thus a detailed description thereof will be omitted.

(2) Description of Coupling Relationship Between Test Device 10 and Sensor Device 20

Referring to FIG. 14, a state in which the sensor device 20 is coupled to the test device 10 is shown.

In the illustrated embodiment, it is assumed that the sensor device 20 is moved in a direction coupled to the test device 10 through an opening portion disposed at a front side of the sensor insertion portion 130, that is, a front side thereof. Alternatively, the sensor device 20 may be located at the sensor insertion portion 130 through the other direction, that is, an upper side or a lower side thereof.

When the insertion of sensor device 20 into the sensor insertion portion 130 is completed, one side of the sensor device 20 facing the body portion 110, that is, a front side thereof in the illustrated embodiment, may be in contact with the body portion 110. Accordingly, the extent to which the sensor device 20 is inserted into the sensor insertion portion 130 may be limited.

In this state, the sensor coil 22 of the sensor device 20 may be disposed to overlap with the conductive protruding portion 430 in a width direction, that is, in a left-right direction in the illustrated embodiment.

When the switch 220 is manipulated to operate the control board 210, a direct current is converted into an alternating current and transmitted to the coil portion 300. The coil portion 300 amplifies the received alternating current at a high frequency and transmits it to the energization portion 400.

The energization portion 400 forms a magnetic field using the received alternating current. The sensor coil 22 generates power using the formed magnetic field, and the sensor device 20 is operated by the generated power.

Accordingly, through a simple process of inserting the sensor device 20 into the sensor insertion unit 130 and operating the switch 220, whether or not the sensor device 20 operates normally may be easily tested.

Though the present disclosure has been described with reference to preferred embodiments thereof, it will be apparent to those skilled in the art that various changes and modifications can be made without departing from the concept and scope of the invention as defined in the following claims.

REFERENCE SIGNS LIST

10: Test Device
20: Sensor Device
21: Sensor Body
22: Sensor Coil
100: Housing
110: Body Portion
120: Extension Portion
130: Sensor Insertion Portion
200: Control Portion
210: Control Board
220: Switch
230: Conducting Wire Portion
231: Power Conducting Wire
232: Coil Conducting Wire
300: Coil Portion
400: Energization Portion
410: Coil Coupling Portion
420: Arm Portion
430: Conductive Protruding Portion
440: Space Portion
500: Power Source Portion
1000: Test Device According to Related Art
1100: Current Supply Portion
1200: Conducting Wire Member
1300: Busbar
1400: Sensor Device
1410: Sensor Body
1420: Band
1430: Coil

The invention claimed is:

1. A test device comprising:
a power source portion that supplies a direct current;
a control portion conductively connected to the power source portion to convert the direct current into first alternating current;
a coil portion conductively connected to the control portion to form a first magnetic field using the first alternating current; and
an energization portion in electromagnetic communication with the coil portion on a first side and defining a space portion on a second side, opposite to the first side, the energization portion configured to produce a second alternating current via the first magnetic field and a second magnetic field via the second alternating current to induce a third alternating current via the second magnetic field in a harvesting coil of a sensor device when the sensor device is inserted into the space portion, wherein the third alternating current is configured to power the sensor device to measure an environmental value, the environmental value selected from the group consisting of:
a temperature;
a humidity;
a dust concentration; and
a pressure.

2. The test device of claim 1, wherein the coil portion is wound around the energization portion.

3. The test device of claim 2, wherein a plurality of coil portions are provided, and the plurality of coil portions are wound around the energization portion at different positions.

4. The test device of claim 1, wherein the energization portion comprises:
a coil coupling portion around which the coil portion is wound, the coil coupling portion extending in a first direction;
a first arm portion extending in a second direction, perpendicular to the first direction, from a first side of the coil coupling portion;
second arm portion extending in the second direction from a second side of the coil coupling portion, opposite to the first side;
a first protruding portion extending in the first direction from the first arm portion;
a second protruding portion extending towards the first protruding portion in the first direction from the second arm portion, wherein the space portion is defined between the first protruding portion and the second protruding portion,
wherein the energization portion forms the second alternating current using the first magnetic field induced on the energization portion by the coil portion to produce the second magnetic field using the second alternating current.

5. The test device of claim 4, wherein the energization portion is formed of a ferromagnetic body.

6. The test device of claim 1, wherein the control portion comprises:

a control board that converts the direct current into the first alternating current;
a power conducting wire conductively connecting the control board and the power source portion to each other; and
a coil conducting wire conductively connecting the control board and the coil portion to each other.

7. The test device of claim 6, wherein the control portion comprises a switch having a portion thereof exposed to an outside of a housing in which the control portion is accommodated and being connected to the control board to receive a control signal for operating the control board.

8. The test device of claim 1, wherein the power source portion is provided with a rechargeable battery.

9. The test device of claim 1, further comprising:
a housing provided with a space therein accommodating the control portion, the coil portion, and the energization portion.

10. The test device of claim 9, wherein the housing comprises:
a body portion accommodating the control portion, the coil portion, and a part of the energization portion; and
an extension portion continuously extending to the body portion to accommodate a remaining part of the energization portion, the extension portion being disposed to extend from the body portion.

11. The test device of claim 10, wherein a plurality of extension portions are provided, and the plurality of extension portions are spaced apart from each other and disposed to face each other, and the housing comprises a sensor insertion portion, which is a space partially surrounded by the body portion and the plurality of extension portions.

12. The test device of claim 1, wherein:
the coil portion defines the first magnetic field with a first field direction;
the energization portion defines the second magnetic field with a second field direction, perpendicular to the first field direction; and
the third alternating current induces a third magnetic field via the harvesting coil having a third field direction, substantially parallel to the second field direction.

* * * * *